US009281140B2

(12) United States Patent
Acker et al.

(10) Patent No.: US 9,281,140 B2
(45) Date of Patent: Mar. 8, 2016

(54) LIGHTED SWITCH

(71) Applicant: Advanced Conservation Technology Distribution, Inc., Costa Mesa, CA (US)

(72) Inventors: Larry K. Acker, Newport Beach, CA (US); Robert Jones, Costa Mesa, CA (US)

(73) Assignee: ADVANCED CONSERVATION TECHNOLOGIES DEVELOPMENT, INC, Costa Mesa, CA (US)

( * ) Notice: Subject to any disclaimer, the term of this patent is extended or adjusted under 35 U.S.C. 154(b) by 133 days.

(21) Appl. No.: 14/253,442

(22) Filed: Apr. 15, 2014

(65) Prior Publication Data

US 2015/0294815 A1 Oct. 15, 2015

(51) Int. Cl.

| | |
|---|---|
| ***H01H 3/00*** | (2006.01) |
| ***H01H 13/02*** | (2006.01) |
| ***H02J 1/00*** | (2006.01) |
| ***H01H 13/14*** | (2006.01) |
| ***H05B 33/08*** | (2006.01) |

(52) U.S. Cl.

CPC ............. *H01H 13/023* (2013.01); *H01H 13/14* (2013.01); *H02J 1/00* (2013.01); *H05B 33/0842* (2013.01); *H01H 2219/036* (2013.01); *Y10T 307/937* (2015.04); *Y10T 307/944* (2015.04); *Y10T 307/977* (2015.04)

(58) Field of Classification Search

CPC ................ H01H 13/023; H01H 13/14; H01H 2219/036; H02J 1/00; H05B 33/0842; Y10T 307/937; Y10T 307/944; Y10T 307/977

See application file for complete search history.

(56) References Cited

U.S. PATENT DOCUMENTS

| | | | | |
|---|---|---|---|---|
| 4,760,384 | A * | 7/1988 | Vila-Masot ............ | H01H 71/04 335/17 |
| 2002/0008628 | A1 * | 1/2002 | Sadjadi .................... | G08B 5/36 340/638 |
| 2008/0290817 | A1 * | 11/2008 | Ku ..................... | H05B 33/0803 315/294 |
| 2009/0115400 | A1 * | 5/2009 | Hunter ................. | G01R 15/183 324/119 |
| 2010/0127626 | A1 * | 5/2010 | Altonen ............... | H05B 39/085 315/129 |
| 2013/0016462 | A1 * | 1/2013 | Howitt ................ | A47J 27/2105 361/679.01 |
| 2013/0021119 | A1 * | 1/2013 | Sid ......................... | B60K 28/10 335/1 |
| 2013/0334203 | A1 * | 12/2013 | Legatti ................. | H05B 1/0261 219/509 |
| 2014/0167638 | A1 * | 6/2014 | West .................. | H05B 33/0824 315/224 |

* cited by examiner

*Primary Examiner* — Daniel Cavallari

(74) *Attorney, Agent, or Firm* — Carlos A. Fisher; Stout, Uxa & Buyan LLP

(57) ABSTRACT

The invention is directed to a switch comprising an LED for indicating when a connected electrical device is activated or not. In certain examples, the electrical device is a water pump. In certain examples, the invention is drawn to a circuit comprising a switch, a logic circuit, an electrical device, and an LED subcircuit, whereby the electrical device is turned on by closing the switch, and whereby the LED functions as an indicator light remaining on while the electrical device remains on, and turning off when the electrical device is turned off.

16 Claims, 3 Drawing Sheets

QUIESENT CONDITIONS

QUIESENT CONDITIONS

SWITCH ON CONDITION

LIGHTED SWITCH

FIELD OF THE INVENTION

The present invention concerns electrical circuitry and design of power switches in the field of water pumps and hot water supply.

BACKGROUND AND INVENTION

Electrical switches are components that either make or break an electrical circuit. Such switches may either interrupt current flow to a conductor, initiate current flow to a conductor, or may divert current flow from one conductor to another.

Switches may take many different forms; the simplest switch is a manually operated electromechanical switch, in which one or more sets of electrical contacts are connected to electrical circuits external to the switch. Each set of contacts can be "open", meaning the contacts are electrically unconnected, or the contacts may be "closed" meaning that the contacts are electrically connected such that a current flows between the contacts.

A switch may be actuated (meaning that it may change its state) by a human or by various other control means (such as by a sensor signal linked to variables such as temperature, pressure, time, date, current, voltage, force, etc. A switch that is operated by another electrical signal is called a relay.

In the simplest form a switch comprises two or more conductive elements called contacts, each connected to an external circuit in a manner such that when the contacts are made to "touch" they complete (close) the circuit, and when they separate they open (break) the circuit. Contact materials are generally chosen on the basis of their conductivity, hardness, strength, and their resistance to rust, oxidation, and other corrosion.

Switches in which the contacts remain in one state until the switch is actuated (such as a push-button switch) the contacts can either be "normally open" ("NO") unless closed by the operation of the switch, or "normally closed" ("NC") unless opened by the actuation of the switch. A switch may have both kinds of contact, in which case it is called a "changeover" switch. A switch can momentarily make the new contact before breaking the contact with the old circuit ("make-before-break" switch or "MBB") or can break the old circuit before it makes the new one ("break-before-make" switch or "BBM").

When a switch is designed to switch significant power, the transitional state of the switch as well as the ability to withstand continuous operating currents must be considered. When a switch is in the "on" state, its resistance is near zero and very little power is dropped in the contacts; when a switch is in the "off" state, its resistance is extremely high and even less power is dropped in the contacts. However, when the switch is flicked, the resistance must pass through a state where a significant amount of power (perhaps a quarter of the load's rated power may briefly be dropped in the switch.

For this reason, power switches intended to interrupt a load current often have spring mechanisms to make sure the transition between on and off is as short as possible regardless of the speed at which the user actuates the switch. Thus, for example, a push button power switch may have a spring mechanism wherein initially pushing the button results in an increasing mechanical resistance until a contact is made, at which point continuing to depress the button results in the spring causing the contacts to open again.

Power switches usually come in two types. A momentary on-off switch (such as on a laser pointer) usually takes the form of a button and only closes the circuit when the button is depressed. A regular on-off switch (such as on a flashlight) has a constant on-off feature. In the present invention, preferably the switch, which may be a push button power switch, may have a spring mechanism wherein initially pushing the button results in an increasing mechanical resistance until a contact is made, at which point continuing to depress the button results in the spring causing the contacts to open again.

Pushbutton switches are just one type of commonly used electromechanical switch; other switch types may include rocker switches, toggle switches, sliding switches, rotary switches, float switches, mercury tilt switches, knife switches, and the like.

SUMMARY OF THE INVENTION

In some examples the present invention is drawn to a circuit for powering an electrical device, wherein the power is supplied to the electrical device using an electrical switch illuminated by an LED. In some examples, the present invention is directed to electrical switches comprising light-emitting diodes. In certain examples the invention comprises electrical circuits comprising at least one power switch and at least one LED, wherein the power switch contacts are closed momentarily for a period of time sufficient to send a signal to a logic circuit to selectively turn on an electrically powered instrument, and wherein the LED remains illuminated and energized while the instrument remains powered, and is turned off when the power to the instrument is interrupted or discontinued. The term "logic circuit" shall mean a microprocessor; that is, a computation engine that is fabricated on a single chip. It will be understood in the present invention that the term "circuit" without the word "logic" associated with it shall not connote a logic circuit.

In another example, the claimed circuit may comprise at least two power sources; a first power supply having a first voltage and a second power supply having a second voltage less than the first voltage. Furthermore, the claimed circuit may comprise a logic circuit as an intermediate component for transmitting a signal via the LED switch to the device to be powered.

For example, power from the first power source may be prevented from reaching a logic circuit by said switch when the switch is in the default "open" position (and the device is in an "unpowered" condition). Furthermore, the light emitting diode (LED; which may be positioned on or within said switch) is directional and is positioned within a switch loop subcircuit in the direction opposing current flow from said first power supply. Preferably the portion of the switch loop subcircuit comprising the LED also comprises a second diode positioned in the same direction opposing current flow from the first power supply.

In preferred examples, the remaining portion of the switch loop subcircuit comprises a first switch contact connected to said first power source (which has a first voltage), and a second switch contact connected to the logic circuit for selectively turning on an electrically powered instrument. The first and second switch contacts are open when the device to be powered in a quiescent or "unpowered" condition. In this condition, the LED is also unpowered because the loop subcircuit is broken and not complete.

The second power supply, having a second voltage less than the first voltage, is connected to the circuit at a first locus, positioned between the second switch contact and the logic circuit. Preferably the second power supply has a current limiting diode (a diode limiting the forward current to about 5 mAmps to power the LED) positioned upstream from the first locus.

The current limiting diode also acts to limit the current flow when the switch is made; without a current limit the 12V supply would be overloaded when the switch is made and the control circuit could malfunction. The current limiting diode thus isolates the 12V supply from the 20V supply.

Positioned downstream of the first locus and before the connection with the logic circuit a Zener diode is placed before the logic circuit in a reverse bias direction; in order for current to flow into the logic circuit the voltage must be greater than the Zener voltage, or "breakdown" voltage, which is set to be slightly greater than the second voltage. Thus, under a quiescent or "unpowered" condition, current flow from the second power supply to the logic circuit is blocked by the Zener diode.

The logic circuit is designed to receive a signal (such as about 8 volts or more) from the combined first and second power sources; the voltage across the Zener diode will be equal to its breakdown voltage, also called the Zener voltage (for example 12 volts). If the voltage reaching the Zener diode is 20V, the voltage at the logic circuit start signal node will be 8V. In response to this, the logic circuit transmits a "pump on" signal to a transistor, which is used as a switch, to turn on the pump by connecting the first power supply to ground.

For example, in a preferred embodiment the control logic requires a voltage greater than 6V at its start signal node to initiate an "on" condition. 8 volts will be applied to this node when the switch is made. The control logic will turn on the "relay on" transistor. This transistor will provide a current path to ground for the 12V supply and when the switch is open the current path will be through the LED; thus permitting the pump and the LED to be simultaneously on. The pump and LED will stay on until the control logic turns the relay off according to a pre-programmed criterion or set of criteria (such as, without limitation, expiration of a time period, temperature thresholds, temperature gradients, motion sensor, sound sensor or the like). At this point the pump and LED will be off, and the system will be returned to a quiescent condition.

Thus, when the switch is open, the voltage at a location between said second switch contact and said first locus (the "second locus") is substantially the same as the second voltage; the voltage at the first switch contact (the "third locus") is substantially the same as the first voltage, and the voltage at a position between the Zener diode and the logic circuit (the "fourth locus") is substantially zero.

When the switch is closed (for example, when a pushbutton switch is depressed and momentarily closed), the first and second switch contacts are bridged, and the voltage at the third locus and second locus is substantially the same as the first voltage, and the voltage at the fourth locus is a third voltage, comprising at least the difference between said first voltage and the blocking "breakdown" voltage limit of the Zener diode. This voltage must be sufficient to comprise a "start signal" (for example, about 8 mAmps) Preferably, a voltage greater than 6V will be sufficient to comprise a "start signal" for the logic circuit to relay a "pump on signal" to the transistor, as referenced above.

When the pump is on, the first and second switch contacts are not bridged, and there is no forward biased current flowing through the switch loop subcircuit, and the voltage at the second locus is substantially the same as the second voltage, the voltage at the fourth locus is substantially zero, and the voltage at the third locus also substantially 0V (for example, 0.2V.

The current flowing through the LED will be the amount of current (for example 5 mAmps) as determined by the current-limiting diode placed downstream of the second power supply, and will be calibrated to be sufficient to cause the LED to become illuminated.

Finally, if the logic circuit is given a "stop" signal (such as "timing out" of a predetermined time period, or after a sensor connected to the logic circuit detects a stimulus, such as the presence of hot water) the system returns to quiescent conditions. When the logic circuit receives a pre-determined "off" signal (from e.g., a timer or a sensor) an "off" signal is sent to the transistor, which breaks the connection between the first power supply and the instrument to be powered, thereby recreating the initial "quiescent" state.

Advantages to using LED-lighted switches of the present type include the fact that powered components may be remotely located from, or silent to, a user of the powered device. In such an event, the LED on the button is the only indication of whether the system is active or not.

In a particularly preferred embodiment, the switch is a lighted pushbutton. In a particularly preferred embodiment the button activates a water pump, such as a water pump associated with a hot water supply system, such as pumps manufactured and/or sold by TACO, Inc. (Cranston, R.I.), or by the Grundfos company (Grundfos Holding A/S, Poul Due Jensens Vej 7, DK-8850 Bjerringbro, Denmark) or as described in, for example, and of the following U.S. Pat. Nos. 4,945,942; 5,042,524; 5,277,219; 5,385,168; 5,829,475; 6,962,162; 7,779,857; 8,327,873; 8,505,498; and 8,523,001, all owned by Advanced Conservation Technology Distribution, Inc.

DETAILED DESCRIPTION OF THE PREFERRED EXAMPLES

The invention is not limited to the preferred examples, but may be more fully explained with reference to these examples.

Figure 1:
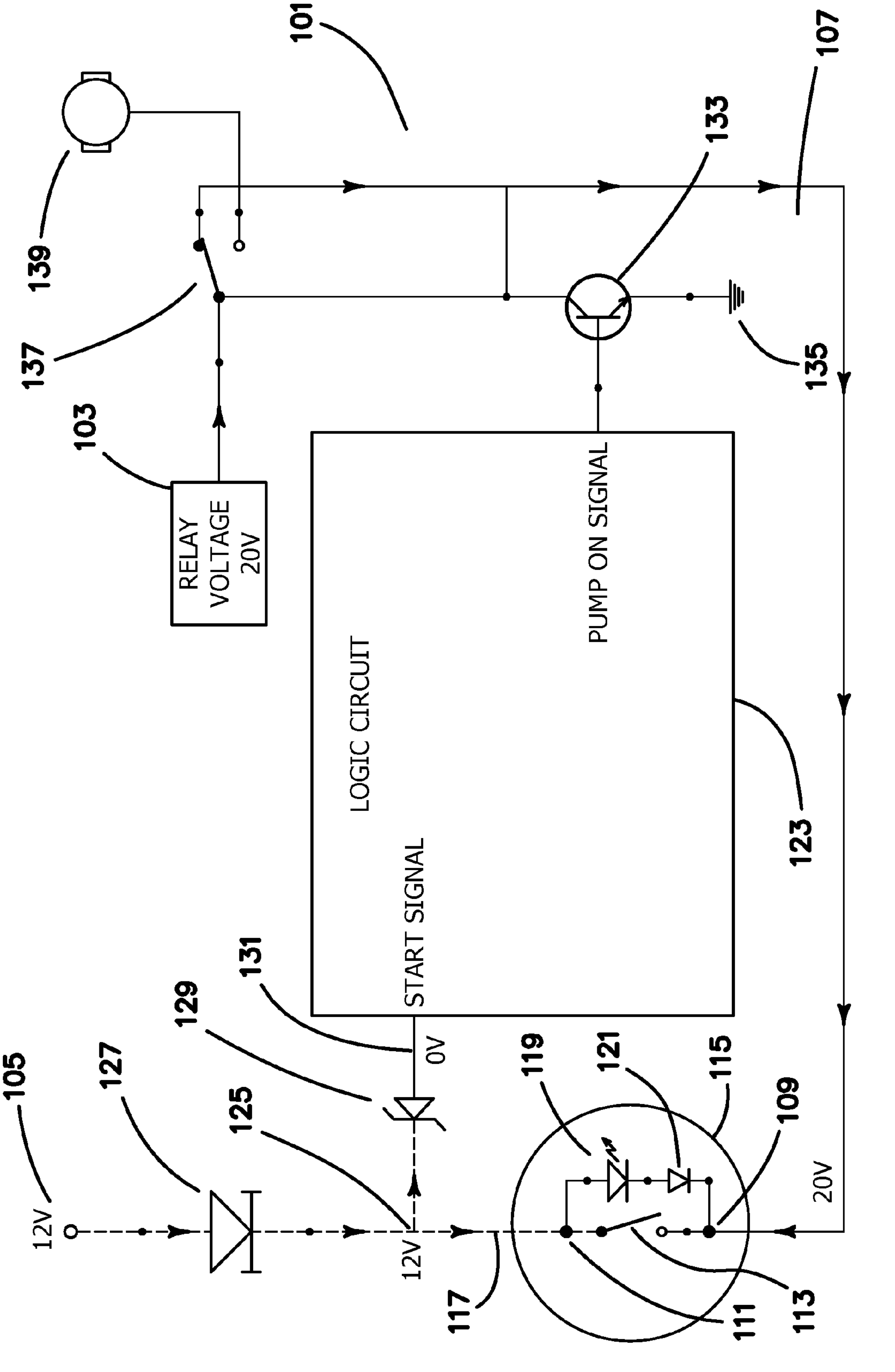
FIG. 1 is an electrical schematic drawing of an electrical circuit showing the invention in a "quiescent" condition.

Referring now to FIG. 1, a circuit (101) is shown in which a first power supply (103) has a first voltage (the "relay voltage") of (20V). A second power supply (105) has a second voltage, less that the first voltage, of 12V. Current from the first power supply (103) passes through a relay switch (137). The relay switch is also electrically connected to transistor (133). In FIG. 1, the relay switch (137) isolates pump (139) from the first power supply (103).

Thus, current from the first power supply (103) runs through relay switch (137) and electrical wire (107), thereby connecting the first power supply (103) to switch loop subcircuit (115). The loop subcircuit (115) comprises (relative to the first power supply) a switch component diagrammatically represented by first switch contact (109), second switch contact (111), and pole (113), and a reverse biased LED circuit component comprising LED (119) and diode (121) electrically connected to the first switch contact (109) and the second switch contact (111), to complete a switch loop subcircuit comprising the switch component and the LED circuit component.

Also connected to second switch contact (111) is a line connected both to second power supply (105) and to logic circuit (121) at a first locus (125). A current-limiting diode (127) is placed between second power supply (105) and the first locus (125); this diode limits the current of electrical power in the forward direction from the second power supply to about 5 mA (milliamperes). Additionally, a Zener diode (129) is placed in line between the first locus (125) and logic circuit (121) opposing current flow to the logic circuit unless it is greater than a given voltage (the Zener voltage); in such a case only the voltage difference between the applied voltage and the Zener voltage is applied downstream of the Zener diode.

In the example shown in FIG. 1, the switch has not been actuated, and therefore the pole (113) is shown as not bridging the first switch contact (109) and the second switch contact (111); in this configuration the pump is not on, the switch is not on, and the LED is not on. Under these conditions, when the first voltage supplied by the first power source (103) is 20V and the second voltage supplied by the second power source (105) is 12V, the voltage at a second locus (117) is 12V, the voltage at a third locus (109) is 20V, and the voltage at a $4^{th}$ locus between the Zener diode and the logic circuit (131) is zero.

Figure 2:
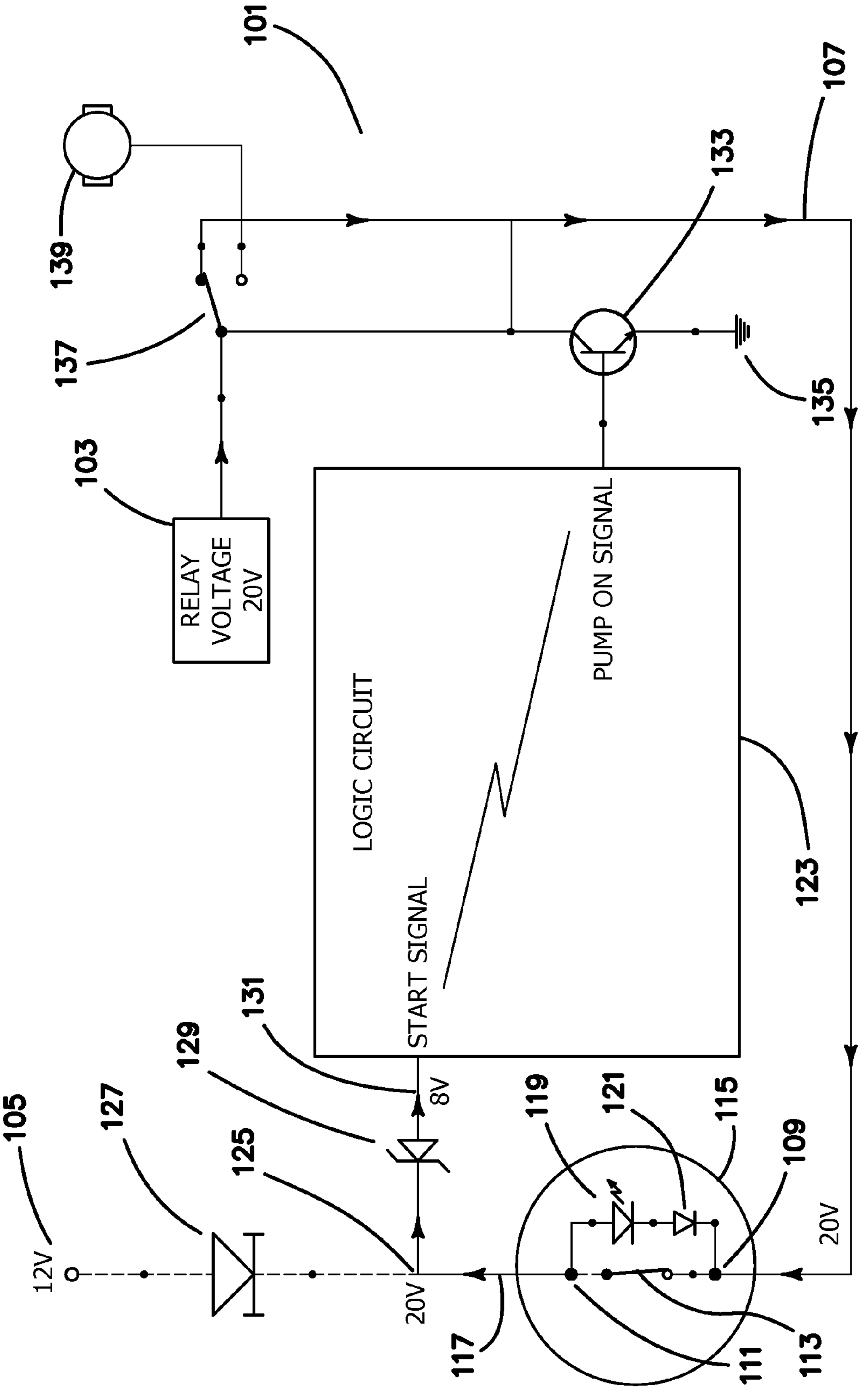
FIG. 2 is an electrical schematic drawing of an electrical circuit showing the invention wherein the switch is actuated.

When the switch is actuated, as shown in FIG. 2, the pole (113) makes contact (preferably momentarily) with first switch contact (109) and second switch contact (111). At that moment, the voltage at the second locus (117) is 20V, the voltage at a third locus (109) is 20V, and the voltage at a $4^{th}$ locus between the Zener diode (which has a Zener voltage of 12V) and the logic circuit (131) is 8V. This latter voltage is sufficient to act as a start signal for the logic circuit (123) to initiate a "pump on" signal which is transmitted from the start signal node to transistor (133).

Figure 3:
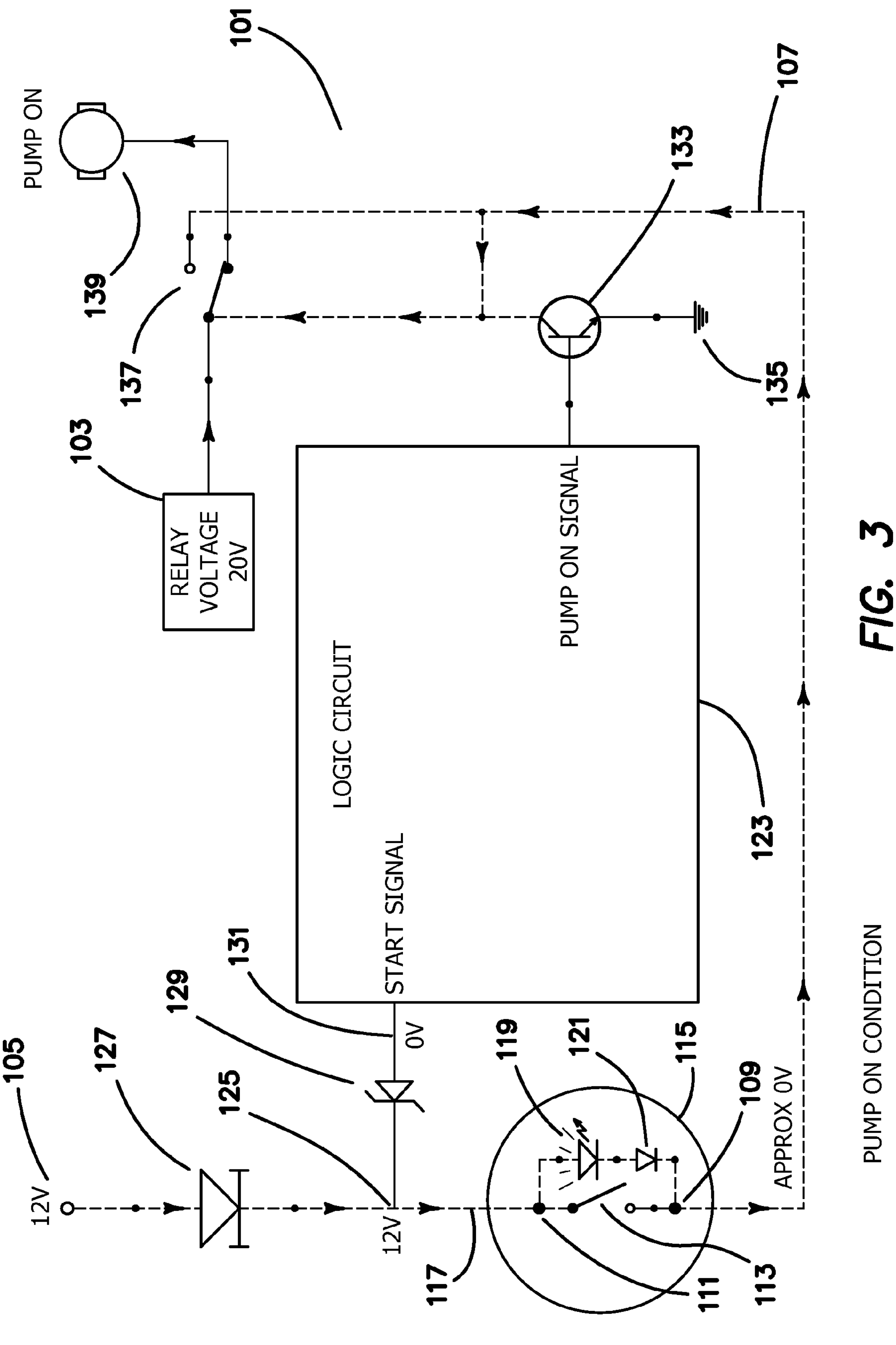
FIG. 3 is an electrical schematic drawing of an electrical circuit showing the invention wherein the pump has received a "pump on" signal.

FIG. 3 shows that when the transistor (133) receives the "pump on" signal it sends a signal to relay switch (137), causing the first voltage (e.g., 20V) from first power source (103) to be switched by the transistor to power pump (139), rather than to energize the circuit via electrical wire (107) shown in this example of the present invention. Transistor (133) also causes the circuit comprising wire (107) to become grounded at (135). The voltage at the third locus (109) will now be substantially (slightly more than) 0V (such as about 0.2 V), as the accumulated voltage drops across the current-limiting diode (127), the LED (119), and the second diode (121) render the voltage almost 0 at this point. Since the first voltage (20V) is no longer available since the first power source (103) has been diverted to power the pump (139), the Zener diode (129) only receives approximately (somewhat less than) 12V from the second power source (105) (less than or equal to the Zener voltage), and the voltage at the $4^{th}$ locus (131) is zero, thus ensuring that the logic circuit receives no current. The 12 volts provided by the second power source (105), which has been limited to an amperage of 5 mA by the current limiting diode (127), is now available to run counter-clockwise around the circuit to power the LED (119) before the current is run to ground (135).

When the pump (139) is turned off by the transistor (133) sending a "pump off" signal to relay switch (137) from the logic circuit, the 20V from the first power source (103) is again diverted to run clockwise around the circuit, and the system returns to its initial conditions.

This invention is exemplified by the description and examples provided herein, but is not limited thereto. The claims which conclude this specification define the metes and bounds of the claimed invention. Each and every publication, patent or patent application mentioned or cited in this application is hereby expressly and individually incorporated by reference herein in its entirety.

What is claimed is:

1. A circuit for powering an electrical device, wherein a connection between a first power source to said electrical device is initiated using an electrical switch, wherein said electrical switch is closed at least momentarily, thereby completing a first electrical circuit, wherein when the switch is placed in the "on" position a current is sent from said first power supply to a microprocessor which then causes said electrical device to turn on, said switch being independently illuminated by a light emitting diode (LED) after said microprocessor causes said electrical device to turn on, regardless whether said first electrical circuit remains completed or not, and wherein when said electrical device is turned off, power to the LED is discontinued.

2. The circuit of claim 1 wherein said LED is powered by an electrical current from a second power source, wherein a first voltage from said first power source is greater than a second voltage from said second power source.

3. The circuit of claim 2 comprising a switch loop subcircuit comprising a) a switch loop component containing at least a first switch contact, a second switch contact, and a pole, and b) an LED-containing loop component comprising at least one LED positioned to oppose current flow from the first power source, wherein said LED-containing loop component is connected to said first switch contact and said second switch contact.

4. The circuit of claim 1 further comprising a current limiting diode positioned between said second power source and said switch loop subcircuit.

5. The circuit of claim 3 comprising a Zener diode positioned between said second power source and said microprocessor having a Zener voltage essentially greater than or equal to said second voltage; said Zener voltage being less than said first voltage.

6. The circuit of claim 5 wherein, when said switch is initially closed, said first voltage permits current flow to the microprocessor, thereby causing said microprocessor to send a "pump on" signal causing said electrical device to turn on.

7. The circuit of claim 6 structured so that said "pump on" signal is sent from said microprocessor to a transistor, which is structured to divert said first voltage from said circuit to said electrical device.

8. The circuit of claim 7, structured to provide said second voltage, at a limited current, to said LED-containing loop component when said first voltage is diverted from said circuit to said electrical device.

9. The circuit of claim 8 wherein said electrical device is a water pump.

10. A circuit comprising a lighted pushbutton switch, comprising:

A pushbutton switch connectable between a first switch contact connected to a first power source having a first voltage, and a second switch contact connected to a logic circuit for selectively turning on a electrically powered device; wherein a second power source, having a second voltage less than the first voltage, is connected at a first locus interposed between the second switch contact and the logic circuit, and wherein a Zener diode is interposed between the first locus and the logic circuit to block a signal having a voltage less than or equal to said second voltage; and an LED circuit connected to said first switch contact and said second switch contact in parallel to the switch, the LED circuit including an LED having a directionality facing away from said logic circuit connected in series with a diode having the same directionality; said circuit configured whereby:

when said switch is open, a voltage at a second locus between said second switch contact and said first locus is essentially said second voltage; a voltage at said first switch contact (a third locus) is essentially said first voltage; and a voltage at a fourth locus between the Zener diode and the logic circuit is essentially zero;

when said switch is closed, the voltage at the second locus and the third locus is essentially said first voltage; and the voltage at said fourth locus is a third voltage, comprising at least the difference between said first voltage and the blocking voltage of the Zener diode, said third voltage being sufficient to signal the logic circuit to turn start the electrical device; said LED is unilluminated, and the logic circuit sends a signal to a transistor to cause said first voltage to energize said device, and when said switch reopens and said electrical device is still running, the voltage at the second locus is essentially said second voltage; the voltage at the third locus and the fourth locus is essentially zero.

11. The circuit of claim 10 wherein the LED is attached to said pushbutton switch.

12. The circuit of claim 11 wherein the LED is located within said pushbutton switch.

13. The circuit of claim 11 wherein said electrical device is a water pump.

14. The circuit of claim 13 wherein the pushbutton switch is mounted on the water pump.

15. The circuit of claim 13 wherein the pushbutton switch is not mounted on the water pump.

16. The circuit of claim 13 comprising a first pushbutton switch mounted on the water pump, and a second circuit comprising a second pushbutton switch not mounted on the water pump.

* * * * *